US012775740B2

(12) United States Patent
Paspuel et al.

(10) Patent No.: US 12,775,740 B2
(45) Date of Patent: Oct. 27, 2026

(54) METHOD AND SYSTEM PERFORMING SELECTIVE IMAGE MODIFICATION FOR PROTECTING IDENTITIES

(71) Applicant: BRIGHTER AI TECHNOLOGIES GMBH, Berlin (DE)

(72) Inventors: Marco Paspuel, Berlin (DE); Teodora Chereches, Berlin (DE); Sreenjoy Chatterjee, Berlin (DE); Marian Gläser, Berlin (DE)

(73) Assignee: BRIGHTER AI TECHNOLOGIES GMBH, Berlin (DE)

( * ) Notice: Subject to any disclaimer, the term of this patent is extended or adjusted under 35 U.S.C. 154(b) by 0 days.

(21) Appl. No.: 18/682,100

(22) PCT Filed: Aug. 10, 2022

(86) PCT No.: PCT/EP2022/072475

§ 371 (c)(1),
(2) Date: Feb. 7, 2024

(87) PCT Pub. No.: WO2023/017092

PCT Pub. Date: Feb. 16, 2023

(65) Prior Publication Data

US 2025/0124168 A1 Apr. 17, 2025

(30) Foreign Application Priority Data

Aug. 12, 2021 (EP) .................................... 21191073

(51) Int. Cl.
*G06F 21/62* (2013.01)
*G06T 11/60* (2026.01)
(Continued)

(52) U.S. Cl.
CPC .......... *G06F 21/6254* (2013.01); *G06T 11/60* (2013.01); *G06V 10/761* (2022.01); *H04L 9/0825* (2013.01); *G06V 2201/07* (2022.01)

(58) Field of Classification Search
CPC .............. G06F 21/6254; G06V 10/761; G06V 2201/07; G06T 11/60; H04L 9/0825
See application file for complete search history.

(56) References Cited

U.S. PATENT DOCUMENTS 9,396,354 B1 * 7/2016 Murphy .............. G06F 21/6245
10,893,302 B1 1/2021 Trim et al.
(Continued)

OTHER PUBLICATIONS

"Cosine similarity", [Online]. Retrieved from the Internet: <URL: https://en.wikipedia.org/wiki/Cosine_similarity>, (accessed: Feb. 1, 2024), 7 pgs.
(Continued)

*Primary Examiner* — Darshan I Dhruv
(74) *Attorney, Agent, or Firm* — Schwegman Lundberg & Woessner, P.A.

(57) ABSTRACT

A method of selective image modification for protecting identities, comprises capturing a first image using an image-capturing unit of a first device and detecting, by the first device, an anonymizable object in the first image. The method further comprises determining, by the first device, that the anonymizable object is associated with a second device and modifying, by the first device, the anonymizable object in the first image by using privacy setting data received from the second device.

12 Claims, 4 Drawing Sheets

(51) Int. Cl.
*G06V 10/74* (2022.01)
*H04L 9/08* (2006.01)

(56) References Cited

U.S. PATENT DOCUMENTS

| | | | | |
|---|---|---|---|---|
| 11,270,025 | B2 * | 3/2022 | Arnold | G06F 21/602 |
| 2015/0242638 | A1 * | 8/2015 | Bitran | G06F 21/6245 726/26 |
| 2016/0019415 | A1 | 1/2016 | Ra et al. | |
| 2016/0180183 | A1 * | 6/2016 | Bourdev | G06V 40/10 382/115 |
| 2017/0126630 | A1 | 5/2017 | Ekambaram et al. | |
| 2018/0268240 | A1 * | 9/2018 | Loce | G06V 20/70 |
| 2019/0228182 | A1 * | 7/2019 | Einecke | G06F 21/6254 |
| 2020/0042685 | A1 * | 2/2020 | Tussy | H04L 63/0861 |
| 2020/0097767 | A1 * | 3/2020 | Perry | G06V 40/172 |
| 2020/0098096 | A1 * | 3/2020 | Moloney | G06F 21/6254 |
| 2020/0211162 | A1 * | 7/2020 | Ra | G06T 7/73 |
| 2020/0294294 | A1 * | 9/2020 | Petriv | G06T 11/60 |
| 2020/0302572 | A1 * | 9/2020 | Ohira | G06T 3/18 |
| 2021/0056231 | A1 * | 2/2021 | Kwatra | H04W 12/63 |
| 2021/0240851 | A1 * | 8/2021 | Badalone | G06Q 30/0201 |
| 2021/0350938 | A1 * | 11/2021 | Teissonniere | H04L 9/16 |
| 2021/0351927 | A1 * | 11/2021 | Gal | G06F 21/6245 |
| 2022/0245396 | A1 * | 8/2022 | Bapat | G06F 16/784 |

OTHER PUBLICATIONS

"International Application Serial No. PCT/EP2022/072475, International Search Report dated Nov. 15, 2022", (Nov. 15, 2022), 4 pgs.

"International Application Serial No. PCT/EP2022/072475, Written Opinion dated Nov. 15, 2022", (Nov. 15, 2022), 5 pgs.

Chen, Weihua, et al., "Beyond triplet loss: a deep quadruplet network for person re-identification", Proceedings of the IEEE conference on computer vision and pattern recognition, (2017), 403-412.

Soleymani, Roghayeh, et al., "Progressive boosting for class imbalance and its application to face re-identification", Expert Systems with Applications 101, (Jun. 5, 2017), 271-291.

Wang, Faqiang, et al., "Joint learning of single-image and cross-image representations for person re-identification", Proceedings of the IEEE conference on computer vision and pattern recognition, (2016), 1288-1296.

"European Application No. 21 191 073.2, Office Action dated Aug. 4, 2025", (Aug. 4, 2025), 8 pgs.

* cited by examiner

METHOD AND SYSTEM PERFORMING SELECTIVE IMAGE MODIFICATION FOR PROTECTING IDENTITIES

PRIORITY APPLICATIONS

This application is a U.S. National Stage Filing under 35 U.S.C. § 371 from International Application No. PCT/EP2022/072475, filed on Aug. 10, 2022, and published as WO2023/017092 on Feb. 16, 2023, which claims the benefit of priority to European Application No. 21191073.2, filed on Aug. 12, 2021; the benefit of priority of each of which is hereby claimed herein, and which applications and publication are hereby incorporated herein by reference in their entireties.

The present disclosure relates to the field of data anonymization. Specifically, the subject-matter of the present disclosure relates to a computer-implemented method and a system that allows for user devices to engage in image modification in order to protect individual identities.

Already today smartphones have built-in cameras. Moreover, the digital age has boosted the prevalence of CCTV surveillance. According to a prediction by LDV Capital (45 *Billion Cameras by* 2022 *Fuel Business Opportunities—Five Year Visual Technology Market Analysis*, August 2017), the number of cameras around the world will increase to at least 220% or 45 billion by 2022. Furthermore, it is well-known that the people in the city of London are subjected to CCTV surveillance over 300 times a day.

Despite providing many advantages, using mass visual technology hardware also entails some alarming consequences. Privacy issues, such as how images with people present thereof, are distributed are of grave concern.

Additionally, several private scenarios lead to concerns with respect to privacy for ordinary people. For example, at parties or popular tourist attraction points, strangers or unfamiliar people tend to be unintentionally captured in private photographs. This can be a source of serious privacy concern due to the fact that such images of individuals who did not consent to their profiles being captured may be shared or uploaded online.

Nevertheless, data collection is vital for both businesses and consumers for a variety of reasons including the provision and receipt of personalized services. However, as a result of regulations such as GDPR and those that will likely be enacted in the future across the globe, businesses and private citizens are increasingly expected to ask for consent before collecting personal data, and to provide users the right to access and delete the data collected on them.

Presently, there exist several indirect measures as a response to this problem. In view of GDPR, there exist solutions that help large data processing companies to be GDPR compliant. This usually involves anonymization, i.e. image modification taking place on a central server. Companies also opt for saving the metadata rather than the actual image information. Metadata describes the image data and provides information about the content of an image. For example, an image may include metadata that describes how large the picture is, the color depth, the image resolution, when the image was created, and other data. Moreover, in machine learning image analysis, metadata of an image or a video frame may include information regarding the physical entities depicted in the image, the number of such physical entities, their locations and so forth. In image segmentation, upon automatic detection of pre-trained objects in an image, these objects are classified and the resulting classifications are then stored as metadata.

When metadata instead of the raw image data is stored, that generally means a loss in terms of content of the stored data and a loss regarding the options for analytic processing of the data, as it is often not known, at the time of capture of an image, which specific information will be useful in the future.

Furthermore, when processing images in a GDPR compliant manner, it is possible to anonymize, e.g. by pixilation or blurring or also by more sophisticated techniques, every privacy infringing information found in the image. However, that also causes a loss of information regarding the image content, in particular when simple (and therefore faster) anonymization techniques are used. The alternative is to ask every client for consent before capturing and processing images. This, however, is often unfeasible and would further infringe on the user's privacy as personal information needs to be disclosed.

These problems also apply to private scenarios, where the person whose face (or other privacy infringing information) is captured in an image or video stream, may not even know that he or she is currently being captured in an image or on a video.

Thus, there is currently no solution available for privacy preserving processing of data captured without knowledge of the subject, in particular in situations where the person taking the image does not even know the person who is captured by the image. This, in particular applies to private scenarios, where one person captures an image which contains the face of another person. This may happen in scenarios where the two people do not even know each other, such as at tourist attractions, or also at a party where the two people do know each other but still do not ask everyone for consent before taking the picture. With today's social media activity, the person who has captured the image may then upload the image to a social media account, thereby infringing on the other person's privacy. It would be an option to automatically blur all privacy infringing information when uploading an image to social media, however, this greatly reduces the image quality and content as well as the possibilities for further analytic processing of the image. Also many people do not object to, or even like having their images shared online.

Thus, it is an object of the present application to provide solutions for privacy preserving processing of image data, in particular of image data which is captured privately. Especially, a solution is needed which allows for the photographed person to decide for themselves if they want to have their faces (or other privacy infringing information) anonymized in another person's images. The techniques are especially tailored to private scenarios but may, however, also be applied to image data captured by businesses or CCTV or the like.

Several other problems addressed by the present disclosure include various "person-in-the-middle" attacks associated with storing and processing data in a central server, the inappropriateness associated with saving only metadata for certain use cases, and the lack of notification to a person when said person is being visually recorded.

Furthermore, at the present time, there is a lack of option to selectively anonymize a person captured in an image based on the preference of said person. Usually, when an image or video data is being anonymized, either everyone in the image is anonymized or none of the people in the image are anonymized, or it is manually selected which person should be anonymized. Given the amount of data and number of people that may be captured in a single image, selectively anonymizing (e.g. by blurring) each person is tedious and time consuming and also prone to error. Therefore, one objective of the present application is to provide a solution which allows people to be automatically and selectively anonymized in image or video data captured by camera. Selective anonymization may also be referred to as an "opt-in" or "opt-out" with regards to being anonymized. For example, if, by default, all anonymizable objects are left un-anonymized, then a user may selectively opt in for being anonymized. Alternatively, if the default setting is to anonymize all anonymizable objects, it is possible to opt out of the anonymization, thereby selectively skipping the anonymization for the respective anonymizable object.

U.S. Pat. No. 9,396,354 B1 discusses a method executed by a computer including receiving an image from a client device. A facial recognition technique is executed against an individual face within the image to obtain a recognized face. Privacy rules are applied to the image, wherein the privacy rules are associated with privacy settings for a user associated with the recognized face. A privacy protected version of the image is distributed, where the privacy protected version of the image has an altered image feature. However, this method shares some of the disadvantages as mentioned above such as the lack of option to opt in or opt out of a picture recording by way of selective anonymization.

It is an object of the disclosure of the present application to solve the aforementioned problems by the method and the system of the independent claims. Specifically, the invention addresses, among others, the problem of a lack of identity protection for captured images, and the problem of there being no option to selectively to opt in or opt out of a picture recording, where the "opt-in" or "opt-out" is also implemented in a privacy preserving manner. Advantageous further developments are represented by the features of the dependent claims and of the embodiments described.

This objective is solved by the subject matter of the independent claims. Further advantageous implementations are referred to in the dependent claims and disclosed examples.

Thus, in accordance with the present disclosure a method of selective image modification for protecting identities is proposed comprising:

a) capturing a first image by means of an image-capturing unit of a first device;
b) detecting, by the first device, an anonymizable object in the first image;
c) determining, by the first device, that the anonymizable object is associated with a second device; and
d) modifying, by the first device, the anonymizable object in the first image by using privacy setting data associated with the second device.

Herein, the first device and the second device may be smart devices such as smartphones, tablets and/or smart vehicles. Alternatively, the first and the second devices may be other computing devices which may be capable of capturing images and of wireless communication. The image-capturing unit of step a) may be at least one camera which may be integrated as part of the first device. The first image includes visual data which is privacy-infringing when shared publicly. The anonymizable object may be a generic potentially-privacy-infringing entity such as a human face or a vehicle registration plate which might reveal an individual's identity.

The first image might be a still image captured by a photographic camera or a video frame which is captured from a video stream.

After the first image has been captured, the method next detects, in step b) an anonymizable object in the first image. This step may amount to object detection using a pre-defined set of anonymizable objects such as faces, license plates or the like. A state of the art face detection algorithm could, for example, be used to detect human faces. In general object detection algorithms can be implemented for example based on machine learning models such as neural networks or the like.

Method step c) involves determining, by the first device, that the anonymizable object is associated with the second device. That the anonymizable object is associated with the second device may mean that the second device comprises or is associated with a picture of said anonymizable object. Alternatively, the second device may be considered associated with the anonymizable object, if the second device comprises or is associated with an identifier if the anonymizable object Method step c) may be carried out by: calculating, by the first device, a first identifier of the anonymizable object. The first identifier may be calculated using a pre-defined person re-identification, reID, network. In general, a re-identification network is fed image patches to give rise to an identity vector. This network may be based on a machine learning model, which is trained to produce the same identity vector when image patches are taken from the same object, for example from the same person. There are many ways to train the re-identification network to output a specific type of identity vector and to define how such vectors are used to distinguish between identities. For example the re-identification network can be trained to produce a vector of fixed sized independent components. Two identity vectors are then considered to belong to the same object if a certain number of components of the two identity vectors have a distance smaller than a predefined threshold; calculating, by the first device, a similarity measure between the first identifier and a second identifier comprised by the second device; and determining, by the first device, that the anonymizable object is associated with the second device if the similarity measure is above a predefined similarity threshold. Optionally, the similarity measure is calculated by the second device.

By method step c), potentially-privacy-infringing entities may be accurately determined to be associated with a particular device, thereby making it possible to enhance their identity protection based on privacy setting data of said second device and the respective user associated with the second device.

In order to execute method step c), respective information regarding the captured image and/or determined identifiers may be shared between the first and second devices as described below.

After it is determined that the anonymizable object is associated with the second device, the first device then modifies, in step d) the anonymizable object in the first image based on the privacy setting data associated with the second device. In particular, the privacy setting data includes information regarding whether or not to anonymize the anonymizable object associated with the second device. The privacy setting data could thus be implemented as a simple flag indicating whether or not to anonymize, or the privacy setting data could also include more specific information indicating circumstances (such as locations, number of people in the image etc.) in which to anonymize. Also the privacy setting data could optionally include specific information regarding the desired anonymization, for example indicating which personal features (such as facial features, clothes, posture etc.) to modify in order to anonymize the anonymizable object. It is well-known, that features such as gait, posture and even clothes can reveal a person's identity, in particular to those who are familiar with the person. Therefore, when the anonymizable object is a human face, then, in addition to anonymizing said human face, the respective person's gait, posture and/or clothing can additionally be modified as well to reduce the risk of recognition of the respective person from the anonymized image. That is, the gait, posture and/or clothing might not be used during the determination that the anonymizable object is associated with the second device, but might still be modified to increase a level of anonymization. The privacy setting data may be received directly from the second device or may be received by way of a third device, such as a server or a base station of the mobile communication network.

By this method, it becomes possible to protect potentially-privacy-infringing entities present in a captured image. Said potentially-privacy-infringing entities are associated with a plurality of devices by means of their respective identifiers. Upon capturing said captured image by an image-capturing device, said image-capturing device would analyze said respective identifiers in said image, thereby making it possible to protect said potentially-privacy-infringing entities present in said captured image.

If the first image is a video frame, the detection of the anonymizable object in the first image as well as the determining that the anonymizable object is associated with the second device, may additionally take into account at least a second video frame from the same video sequence in order to increase the accuracy of the detection and also to improve the accuracy of the determined identifier as further described below. Furthermore, when the first image is a video frame taken from a video sequence or video stream, the modifying of the image to anonymize the anonymizable object is preferably implemented in such a way that an appearance of the anonymizable object is modified in the same manner and the modification does not change from frame to frame. Also, it suffices to determine the identifier and the association with the second device of the anonymizable object once for each appearance.

An appearance herein refers to a video fragment that starts at the moment a person, or other anonymizable object, comes into the view of the camera until the person leaves the camera view. In the case when the person comes in and out of the camera's view, a timeout window (a number of frames) can optionally be used for the person before the appearance is closed. In this case, the identity of the person in the appearance is retained after the person is out of the camera's view for a given number of frames as long as the number of frames is lower than the timeout window.

During the capturing of the first image by means of the image-capturing unit of the first device, the first device may be physically separated from the second device by a distance smaller than or equal to a distance threshold.

As a result of the physical separation by a distance smaller than or equal to a distance threshold, potentially-privacy-infringing entities located close by, i.e. within the distance threshold may be taken into account when altering the image for privacy protection, thereby protecting their identities. The distance threshold can be set based on the resolution of the captured image and also on the lens used when capturing the image, as objects which are farther away are naturally anonymized due to the limited number of pixels used to depict them.

The method may further comprise capturing a second image by means of an image capturing unit of the second device; detecting, by the second device, a reference object in the second image; calculating, by the second device, the second identifier of the reference object in the second image; and storing the second identifier within a memory associated with the second device. These method steps of the second device may be performed ahead of time, for example when the respective application is first installed or set up on the second device. It might also be possible for the second device to determine several identifiers for different reference objects. For example, parents could add their children's identifiers to their devices, thereby protecting the children's privacy.

In order to determine that the anonymizable object is associated with the second device, it is necessary that respective information regarding the identifiers is exchanged between the first and second devices. To protect the privacy of the user of the second device, this information exchange is preferably performed in a privacy preserving manner. In general, the communication between the first and second device is usually initiated by the first device after the first image has been captured and also after the first device has determined the first identifier. The first device could then be configured to broadcast a message indicating that a first image comprising an anonymizable image has been captured. Said message may for example only be send to devices which are close by, i.e. separated by no more than the distance threshold from the first device. The broadcasting could happen by a means for short distance communication such Bluetooth, near-field communication or the like, or the broadcasting could alternatively be carried out using the mobile communication network, through which the broadcast message is then forwarded to all devices known to be located close by, for example by using GPS coordinates of the devices. The devices, which received the broadcast message may then respond by sending their identifiers and respective privacy setting data to indicate if they would like to be anonymized in case the first identifier matches the second identifier of the respective second device.

When this method is used, the identifiers of all second devices located near the first device when the image was captured would all be received by the first device and could potentially be used by the first device in yet another privacy infringing manner. Therefore, it might be preferable if only partial identifier are exchanged. In this case, according to an example, the broadcast message as described above may comprise a portion of the first identifier. The second device then received the respective message or signal and determines that there is a partial match between the received portion of the first identifier and the second identifier. In this case, the second device may then transmit the whole second identifier or another portion of the second identifier together with the privacy setting data to the first device in order for the first device to determine if there is a complete match or if a complete match is at least likely.

This may still cause problems if the encrypted identifiers are always the same, as information regarding the respective user associated with the identifier might be inferred when the same identifier is received multiple times.

To further protect the privacy of the second device and the associated users, it is additionally possible to encrypt the second identifier or a portion of the second identifier during transmission in order to ensure that the identifier is protected against "man-in-the-middle" attacks and also to ensure that the first device does not gain access to identifiers of other users which may not even be depicted in the image.

To further protect the privacy of users which are not depicted in the image, it is optionally possible to implement an encryption and comparison scheme, by which the first and second identities are encrypted differently but in a way that still allows for comparing them to determine if there is a match.

To achieve this, after the first identifier, which is referred to by $x_1$ in the following, has been obtained, an individual private key is determined for $x_1$. This private key n may be entirely random, i.e. it does not need to be related to $x_1$ in any way. Preferably, n is selected in such a way, for example by randomly choosing n, that n is entirely unrelated to $x_1$. Alternatively, at least a part of $x_1$ might be used in order to determine the key n. The private key n is used as an offset in order to ensure adequate security even when the value of the first identifier $x_1$ is small (which may be associated with weak security, as explained below). Furthermore, n may be used to increase the privacy of the transmitted encryptions, as the adding of the offset n to the first identifier ensures that two encryption determined for the same identifier will be different, thereby making it more difficult for an intruder to infer any knowledge regarding repeated detection of the same identity (and, hence, person) even when intercepting the encrypted identity.

Afterwards, the first device determines a first set of encryptions E1 comprising at least two distinct encryptions of the first identifier, wherein the encryptions of the first set of encryptions E1 are determined based at least on the individual private key n and the first identifier $x_1$.

Similarly, the second device determines a second set of encryption based on the second identifier, which was determined by the second device based on an anonymizable object associated with the second device. The anonymizable object might be a face, a person, a license plate or other privacy infringing visual data belonging, e.g., to the owner of the second device. For ease of notation, the second identifier is referred to by $x_2$ in the following.

Next, an individual private key m is determined, by the second device, for the second identity $x_2$. In the same manner as it is done by the edge device, the individual private key m, which serves as an offset on the second identifier $x_2$, in order to guard $x_2$ against weak security.

The second device then calculates a second set of encryptions E2 comprising at least two distinct encryptions of the second identifier $x_2$, wherein the encryptions of the second set of encryptions E2 are determined based at least on the individual private key m and the second identifier $x_2$.

To further improve the security, the second device may frequently re-determine the second set of encryption by using different individual private keys.

The first or second set of encryptions do not allow for an easy decryption and it is, therefore unfeasible to re-determine the first or second identifier from the first or second set of encryptions.

To determine if the first set of encryptions matches the second set of encryptions, a comparison may be implemented by a cross-check involving at least two encryptions of the first set of encryptions and at least two encryptions of the second set of encryptions.

Such a "cross-check" may be implemented, for example, as follows, wherein correspondence of the first set of encryptions E1 and the set of exception encryptions E2 is determined by the following steps.

Calculating a first result of a first operation which takes as input at least a first encryption S of the first set of encryptions E1 and a first encryption Q of the second set of encryptions E2.

Calculating a second result of a second operation which takes as input at least a second encryption T of the first set E1 of encryptions and a second encryption R of the second set E2 of encryptions.

Determining that the first set of encryptions E1 corresponds to the second set E2 of encryptions if and only if the first result equals the second result.

The cross-check method for comparing the first set of encryptions E1 with the second set of encryptions E2 preferably relies on the encryptions used in both sets being chosen in such a way that all components except for the identifiers $x_1$ and $x_2$ cancel themselves out during a comparison of the first result and the second result. Thus, the first result will equal the second result if and only if the first identifier $x_1$, based on which the first set of encryptions E1 was determined, and the second identifier $x_2$, based on which the second set of encryptions E2 was determined, are equal.

In order for this approach to work, it is preferably that the first and second operations are both homomorphism and that they are preferably based on the same arithmetic operations which were also used to calculate the respective encryptions based on the respective identifiers, the private keys n and m and, possibly, other parameters. Also, for security reasons, it is preferable that the encryption S, T, Q and R are mutually distinct. If this is not the case, then the scheme for determining correspondence as described above would still work, but the security would be considerably weakened.

For this to work, the calculation of the encryptions may, additionally be based on a cryptographic function $f$ and/or a common secret k. The cryptographic function might be publicly known as part of a public-key encryption scheme, in which case the cryptographic function is a one-way function, thereby making decryption very time-consuming and difficult. As explained above and below, decryption of the calculated encryptions might not be necessary, as the resulting encryptions are used for comparison but do not need to be decrypted by any of the involved devices.

Thus, any cryptographic function $f$ may be used. An example for calculating encryptions and exception encryptions while using a cryptographic function $f$ and a binary operation $\oplus$, wherein the binary operation $\oplus$ is a commutative operation, which is preserved by the cryptographic function $f$, i.e. $f(v\oplus w)=f(v)\oplus f(w)$ for all v, w in the domain of the cryptographic function $f$. Encryptions S, T of the first set of encryptions E1 and encryptions Q, R of the second set of encryptions E2 may then for example be calculated in the following way:

$$Q = f(2x_2 \oplus m);\ R = f(x_2 \oplus m \oplus k);\ S = f(n \oplus k);\ \text{and}\ \ T = f(n \oplus x_1).$$

Correspondence between the first set of encryptions E1 and the second set of encryptions E2 can then be determined by deciding whether $Q\oplus S=R\oplus T$. Another layer of security may be added, if the operation $\oplus$ is preferably not publicly known.

Instead of the common secret k it might be also be possible to use separate keys for the first and second device, which are, however, still based on the common secret k. This can, for example, be achieved by determining common secret parts (a, b, c, d), such that $k=a\oplus b$, $k=c\oplus d$, a+c and $a\neq d$. A partitioning of k into two components can, for example be determined for each device individually when the respective app is first installed. The first and second exception encryptions (Q, R) of the set of exception encryptions E2 and the first and second encryptions (S, T) of the first set of encryptions E1 of may then be calculated as follows:

$$Q = f(2x_2 \oplus m \oplus a);\ R = f(x_2 \oplus m \oplus c);$$

$$S = f(n \oplus b);\ \text{and}\ T = f(n \oplus x_1 \oplus d);$$

and wherein the correspondence between the first set of encryptions E1 and the set of exception encryptions E2 is then again determined by deciding whether Q⊕S=R⊕T.

When it is determined that the anonymizable object is associated with the second device and the privacy setting data received from the second device indicates to anonymize anonymizable objects associated with the second device then step d) of the method is carried out, i.e. the image is modified to protect the identity of the user associated with the second device. During the modifying, by the first device, the anonymizable object of the first image based on privacy setting data received from the second device, the first image may be altered by replacing the anonymizable object with a similar, non-privacy-infringing object to generate a third image. The privacy setting data may indicate whether or not to anonyimize anonymizable objects associated with the second device in the first image.

The similar, non-privacy-infringing object might be any object with physical dimensions proportionate to a human face which does not cause any association to any potentially personal information, such as a generic emoticon or the respective image portion may be blurred or pixelated. Therefore, potentially privacy-infringing data is replaced, resulting in the protection of the identities of potentially-privacy-infringing entities.

However, using a generic emoticon or simply blurring or pixelating the image to remove a privacy infringing object often ruins the image for all other purposes. Therefore, according to an example, the similar, non-privacy-infringing object may be determined by taking into account the anonymizable object by applying Deep Natural Anonymization, DNA.

Deep natural anonymization is a technology designed to change an identity vector of an appearance. How much the identity vector is changed is dependent on which attributes should be retained after anonymization and is, therefore, dependent on the application. The minimum requirement is that ID(x)≠ID(DNA(x)) wherein x is an appearance, ID is the re-identification network, or respective mapping, and DNA is the deep natural anonymization mapping.

Deep natural anonymization has the advantage of removing privacy infringing details while preserving other, non-privacy infringing information, for example, in the case of a face, this may mean that the face is modified beyond recognition (by both a human and a facial detection algorithm) while other information such as facial expression, age, gender, ethnicity is preserved. Data that is modified using deep natural anonymization can be used for analytics, for example, regarding consumer satisfaction, etc. without infringing on the privacy of the depicted individuals. Other applications include autonomous driving, people counting and distance measurement. In general, deep natural anonymization determines a different naturally anonymized version for each occurrence of the same person or another identifiable objects, such as license plates. Depending on the application, in addition to anonymizing facial characteristics, other identifying characteristics such as hair, clothes, gait, etc. may also be modified. An information which characteristics are to be modified can for example be transmitted by the second device to the first device, or can be based on default setting of the first device. Using DNA for image modification has the advantage that the resulting image still appears normal, i.e. it is not immediately obvious that the image has even been modified. Thus the image may still be used for other private or commercial purposes but, at the same time, does not infringe on the privacy of people captured in the first image anymore.

During the detecting, by the first device, of the anonymizable object in the first image, it may be determined that the anonymizable object in the first image is a human face. As a result, human faces may be detected and processed by the disclosed method and system, resulting in the replacement or anonymization of said humans faces of an image, thereby protecting the identities associated with them.

The first identifier and the second identifier may each be determined using a pre-defined person re-identification, reID, network, which is used to determine a numeric identifier from visual data, as described above. In order for the system to function properly, the same version of the reID network may be used by all devices involved in the method to ensure that a matching identifier is actually determined when there is a visual match.

In general, a re-identification network is fed image patches to give rise to an identity vector. This network may be based on a machine learning model, which is trained to produce the same identity vector when image patches are taken from the same object, for example from the same person. There are many ways to train the re-identification network to output a specific type of identity vector and to define how such vectors are used to distinguish between identities. For example the re-identification network can be trained to produce a vector of fixed sized independent components. Two identity vectors are then considered to belong to the same object if a certain number of components of the two identity vectors have a distance smaller than a predefined threshold.

However, other methods are also known from face identification/verification research. One example is that if the angle between two identity vectors is smaller than a given threshold, then the vectors are considered to have been produced based on the same object. The re-identification network is in this case trained to minimize the angles between image patches coming from the same identity. In this approach quantization is performed based on the angles of the vectors rather than based on the amplitude of each component, see for example https://en.wikipedia.org/wiki/Cosine_similarity.

Also, a hybrid approach is possible, where sub-vectors that are matched via the angles and the decision whether two identity vectors match is then made based on how many sub-vectors matched.

After an identity vector for the current appearance of the anonymizable object has been determined, the identity vector is quantized. Quantization can result in a single numeric value or might result in a vector of numeric values.

Said quantized identity vector may correspond to the first and/or second identifiers discussed in the present disclosure. The algorithm used for determining the identity vector needs to ensure preciseness of the determined identity vectors in the sense that two appearances of the same object (such as a face, etc.) are mapped to the same or at least to two very similar (i.e. identical within a given, very small error threshold identity vectors. An identity vector is typically a vector of several floating numbers. Furthermore, the algorithm used for determining the identity vector needs to ensure that two different objects, e.g. the face of two different people, are mapped to different identity vectors. Algorithms which achieve these conditions are known, see, for example, the following publications:

Soleymani, Roghayeh, Eric Granger, and Giorgio Fumera. "Progressive boosting for class imbalance and its application to face re-identification." Expert Systems with Applications 101 (2018): 271-291.

Chen, Weihua, et al. "Beyond triplet loss: a deep quadruplet network for person re-identification."

Proceedings of the IEEE Conference on Computer Vision and Pattern Recognition. 2017.

Wang, Faqiang, et al. "Joint learning of single-image and cross-image representations for person re-identification." Proceedings of the IEEE Conference on Computer Vision and Pattern Recognition. 2016.

As a result, potentially-privacy-infringing entities may be accurately determined, thereby protecting their identities.

The method may optionally further comprise notifying, by the first device, to the second device that the anonymizable object is associated with the second device. By this method, an end user can be duly informed of the fact that another person's device recognizes that a privacy-infringing-entity is associated with said end user's device. During the notifying of the second device that the anonymizable object is associated with the second device, a push message may be generated in the second device. Generating a push message is advantageous in that a user of the second device is near-instantly informed that the anonymizable object is associated with the second device.

The method may further comprise encrypting a communication channel between the first device and the second device. The encryption may be carried out by means of a block-chain. A block-chain is a growing list of records, called blocks, that are linked together using cryptography. Each block contains a cryptographic hash of the previous block, a timestamp, and transaction data. The timestamp proves that the transaction data existed when the block was published in order to get into its hash. As blocks each contain information about the block previous to it, they form a chain, with each additional block reinforcing the ones before it. Therefore, block-chains are resistant to modification of their data because once recorded, the data in any given block cannot be altered retroactively without altering all subsequent blocks. The encryption may alternatively be carried out using any other encryption scheme suitable for encrypting a communication channel. An encryption of the communication channel might be combined with the encryption of the identifiers as well as the double-blind comparison scheme as discussed above.

Furthermore, the communication channel may comprise Very High Frequency (VHF) and/or Ultra High Frequency (UHF). Preferably, the Ultra High Frequency (UHF) channel is Wi-Fi or Bluetooth. Their wide-availability with respect to device-to-device communication makes their use as a communication channel ideal.

Further, a first device for selective image modification is proposed, the first device comprising a first image capturing unit configured to capture a first image; a first processing unit configured to detect an anonymizable object in the first image;

determine that the anonymizable object is associated with a second device; and modify the anonymizable object in the first image by using privacy setting data received from the second device.

The first image may be a still image captured by a photographic camera or a moving image or a frame of a moving image captured by a video camera.

By the above device, potentially-privacy-infringing entities become visually anonymized, thereby protecting their identities.

Preferably, the first processing unit is further configured to calculate a first identifier of the anonymizable object; calculate a similarity measure between the first identifier and a second identifier comprised by the second device; and determine that the anonymizable object is associated with the second device if the similarity measure is above a predefined similarity threshold.

By the first processing unit, potentially-privacy-infringing entities may be accurately determined to be associated with a particular device, thereby enhancing their identity protection.

In an embodiment the first device and/or the second device may be real-time devices configured to process data in real-time. The term real-time may signify a short time span in the sense of a delay due to processing or transmitting the image data, that is, an at most insignificant processing and/or transmission delay, for example a delay of less than 5 seconds, preferably less than 1 second, more preferably less than 0.5 seconds and most preferably less than 0.1 seconds. In certain cases the delay may also be longer.

Further, a system for selective image modification is proposed, the system comprising the first device and a second device comprising a second image capturing unit configured for capturing; and a second processing unit, wherein the second processing unit is configured for detecting a reference object in the second image;

calculating the second identifier of the reference object in the second image; and storing the second identifier within a memory associated with the second device.

A reference object thereby refers to an anonymizable object with which the second device is associated such as the face of the user of the second device. The determination of the second identifier based on said reference object by the second device enables comparison of the respective identifiers and thereby enables the proposed selective anonymization scheme.

Further, a system for selective image modification is proposed, the system comprising the first device, and a second device, wherein the first processing unit is further configured to calculate a first identifier of the anonymizable object, the second device comprising:

a receiving unit configured to receive the first identifier and a second identifier and the privacy setting data thereof comprised by the second device;

a calculation unit configured to calculate a similarity measure between the first identifier and the second identifier;

a determination unit configured to determine that the anonymizable object is associated with the second device if the similarity measure is above a predefined similarity threshold; and a transmittal unit configured to transmit to the first device said privacy setting data, wherein the similarity measure is determined to be above the predefined similarity threshold.

By the above system, potentially-privacy-infringing entities become visually anonymized, thereby protecting their identities.

Any optional features described with respect to the method of selective image modification can also be applied in the context of the first device or the system and vice versa.

Examples of the present disclosure will now be specified with respect to the drawings.

Figure 3:
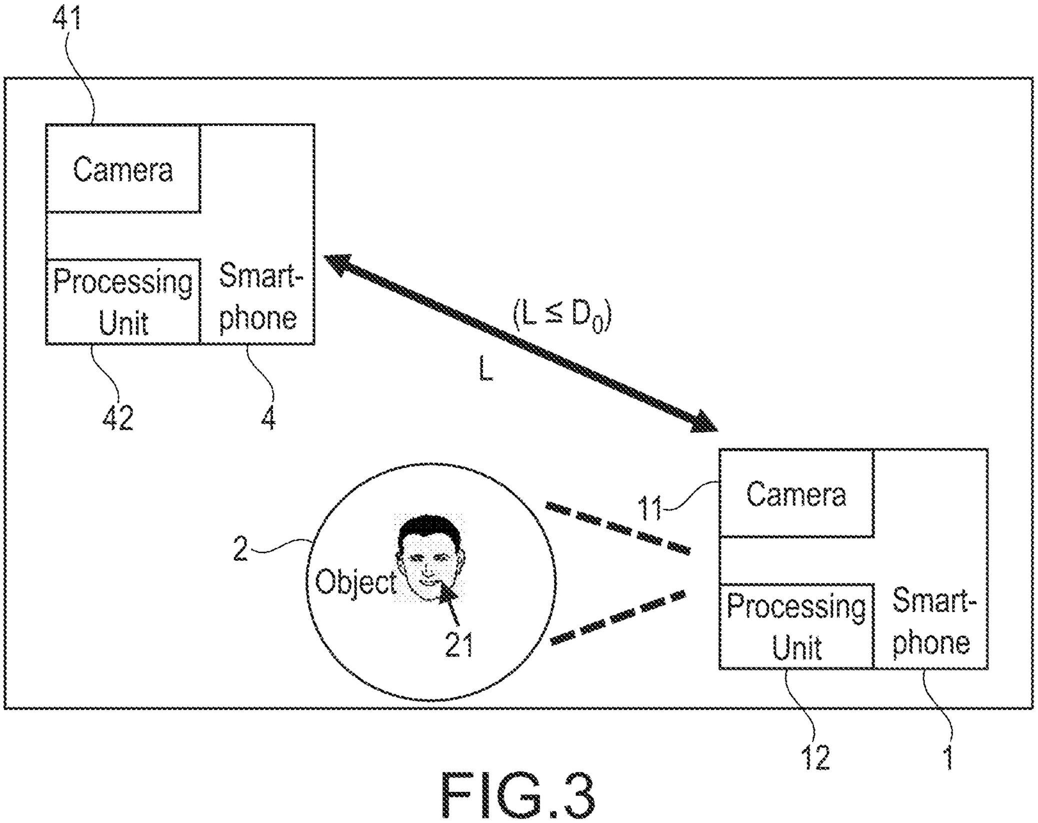
Figure 4:
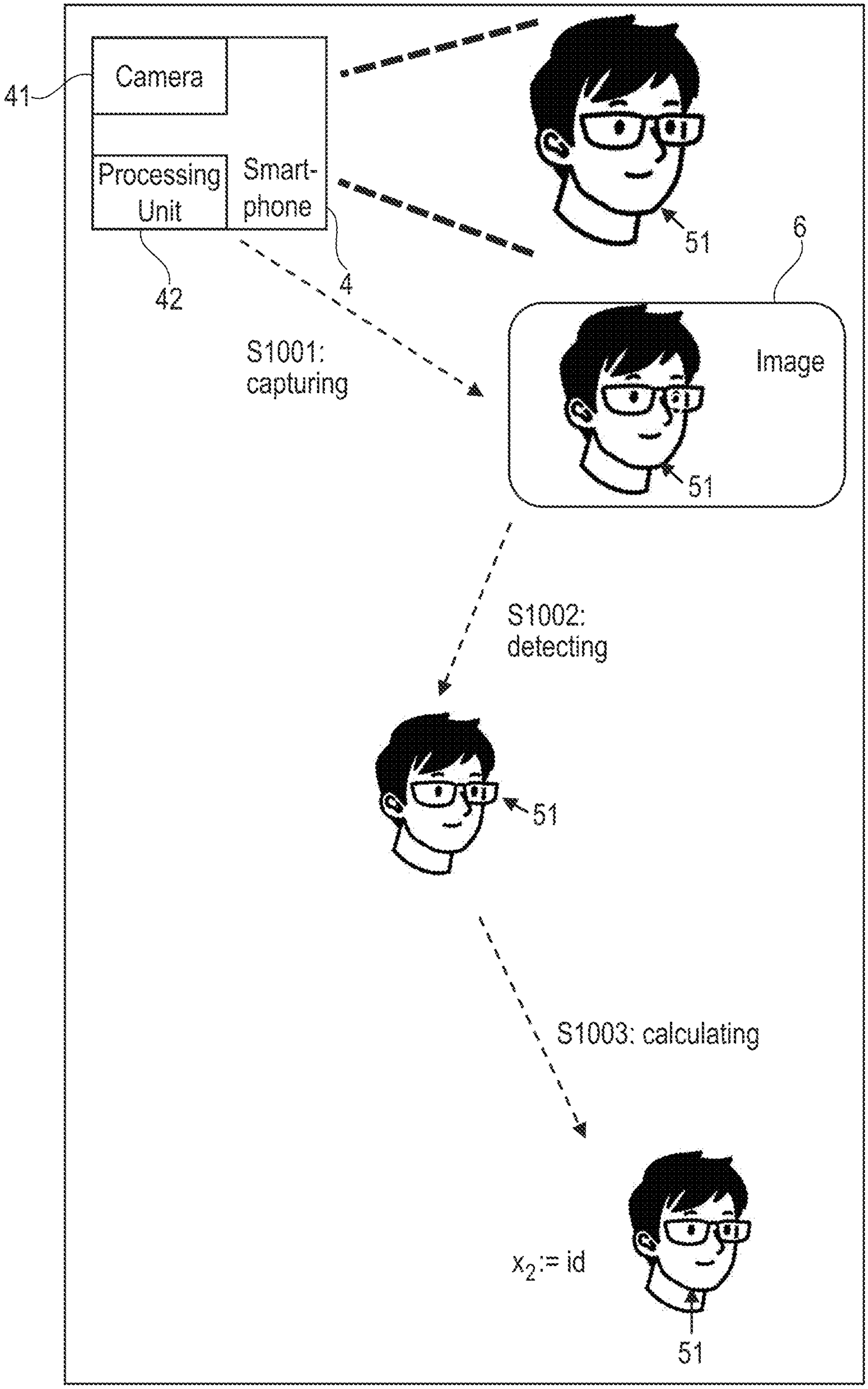
Figure 5:
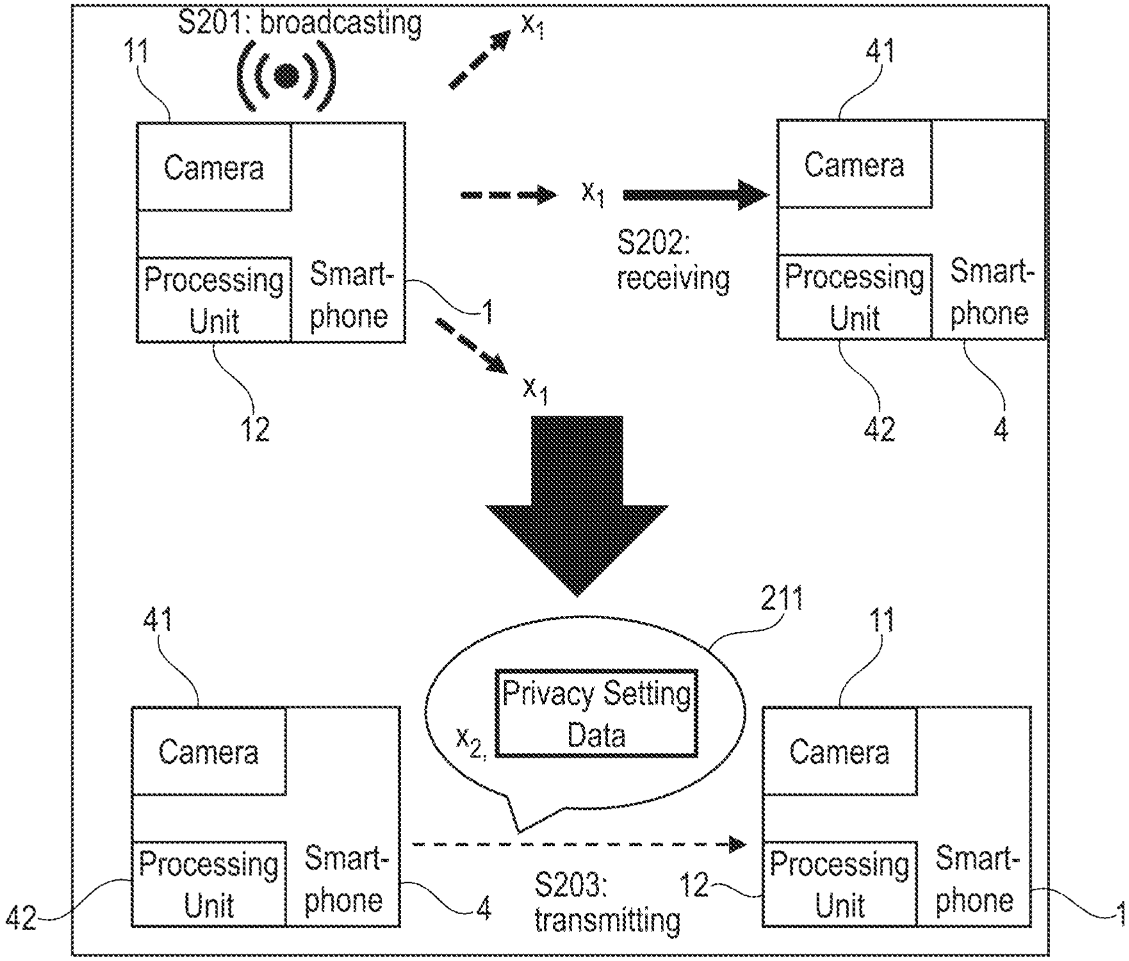
Figure 6:
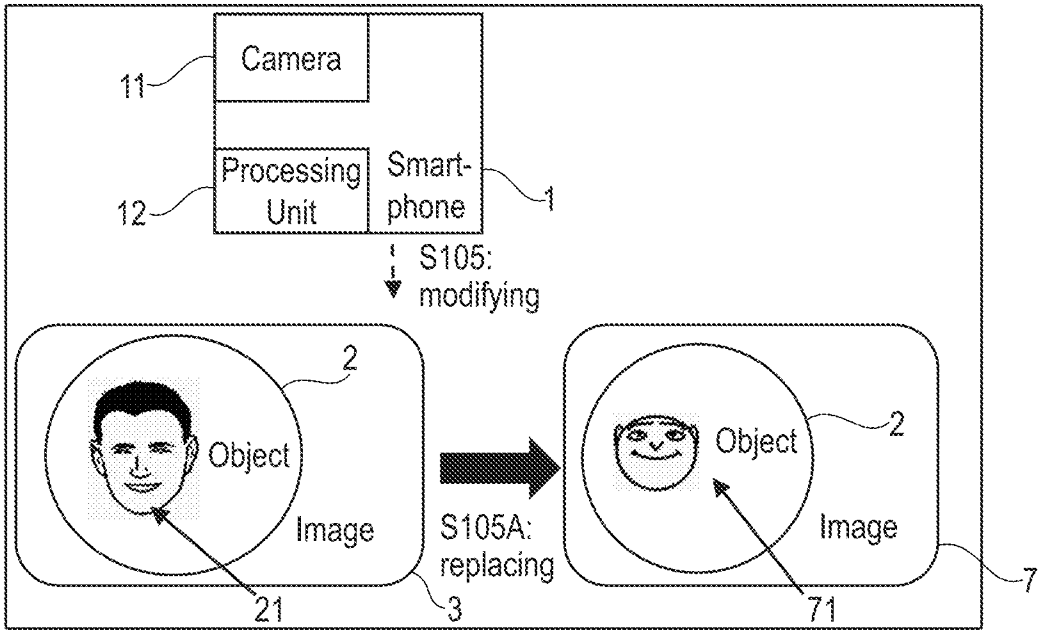

FIG. 3 schematically illustrates a distance requirement of the described method;

FIG. 4 shows a schematic illustration of a "setup" method of a second device;

FIG. 5 shows a schematic illustration of a broadcasting-based implementation of the described method; and FIG. 6 shows a schematic illustration of a modifying step of the described method.

Below specific examples regarding the implementation of a method of selective image modification in accordance with this disclosure for protecting identities are provided.

Figure 1A:
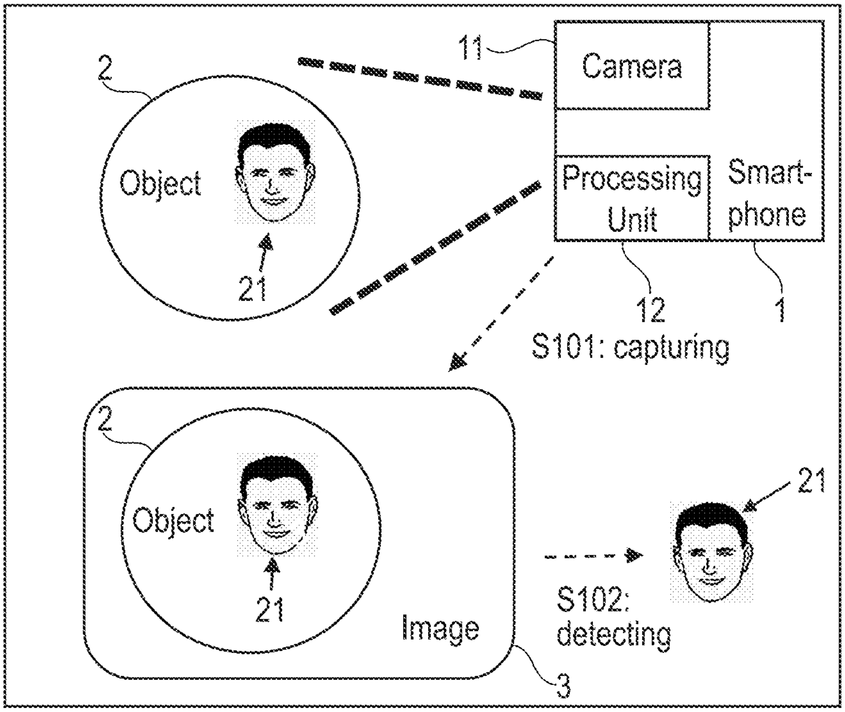
FIG. 1A shows a schematic illustration of a capturing step and a detecting step of the described method.
Figure 1B:
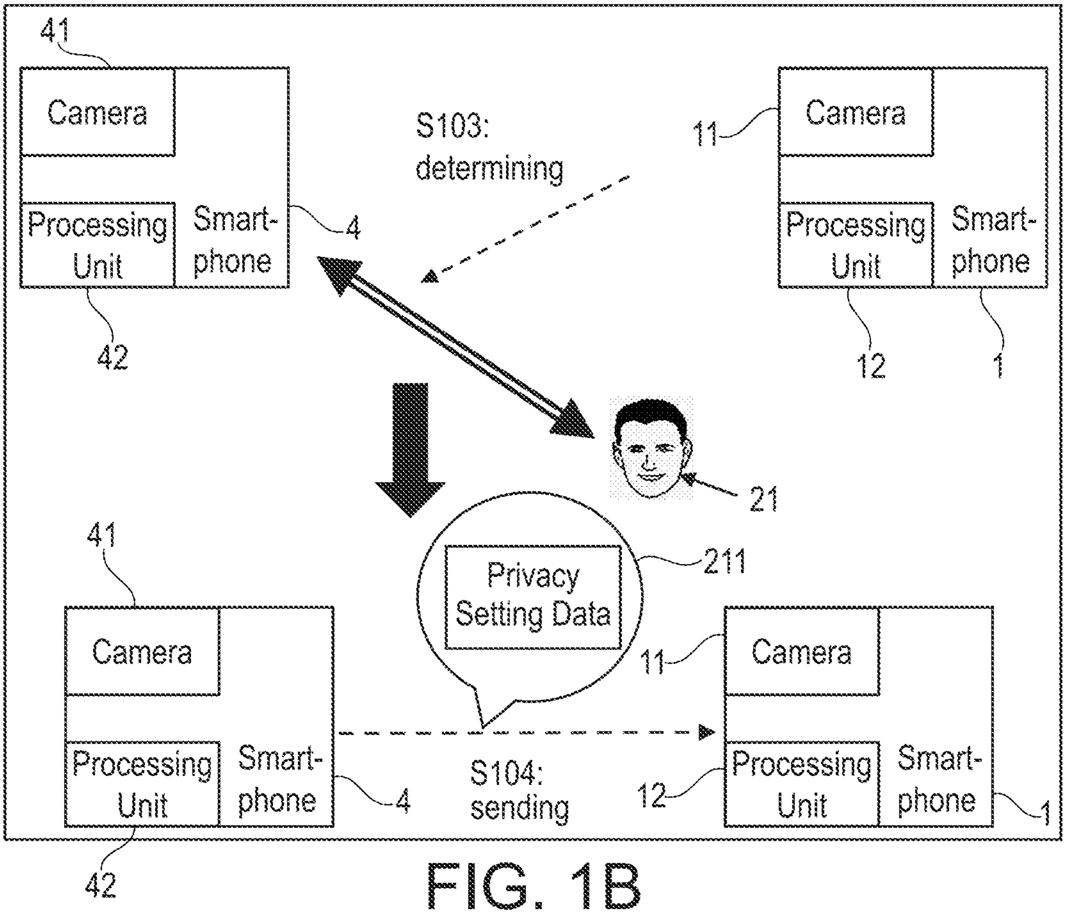
FIG. 1B shows a schematic illustration of a determining step and a sending step of the described method.

FIG. 1A-1B show a schematic illustration of a method of selective image modification. In this illustration, two individuals, Alice with her smartphone 1 and Bob with his smartphone 4, are present at a public place, such as an outdoor museum. Each of their respective smartphones 1 and 4 comprises a mobile application which works with said smartphones to apply a method of selective image modification for protecting identities upon detecting unknown human faces in captured pictures. In the following Alice's smartphone 1 is sometimes also referred to as "first smartphone", while Bob's smartphone is sometimes referred to as "second smartphone".

Alice captures S101 an image 3 of an object 2 using a camera 11 of her smartphone 1 (illustrated within FIG. 1A) while said mobile application is activated. This might be done by first starting up the camera, then applying the setting of "supporting" said mobile application; the mobile application may run a camera application programming interface (API) in the background of her smartphone 1 as a result. The camera API would define the various interactions between the camera 1 and the mobile application e.g. analyzing the picture taken by the camera 1 unfamiliar faces.

An application programming interface (API) is an interface that defines interactions between multiple software applications or mixed hardware-software intermediaries. It defines the kinds of programming calls or requests that can be made, how to make them, the data formats that should be used, the conventions to follow, etc.

After Alice's camera 11 has captured S101 the image 3, her smartphone 1 detects S102 an unfamiliar human face 21 in the image 3 which might be privacy-infringing for the individual to whom said face 21 belongs (illustrated within FIG. 1A); the detection S102 may be carried out using state-of-the-art or custom-implemented face detection algorithms or algorithms for detecting number-plates or other objects that are potentially privacy infringing.

For example, a reliable face-detection approach might be based upon the genetic algorithm and the eigen-face technique: Firstly, the possible human eye regions are detected by testing all the valley regions in the gray-level image. Then the genetic algorithm is used to generate all the possible face regions which include the eyebrows, the iris, the nostril and the mouth corners. Each possible face candidate is normalized to reduce both the lighting effect, which is caused by uneven illumination; and the shirring effect, which is due to head movement. The fitness value of each candidate is measured based on its projection on the eigen-faces. After a number of iterations, all the face candidates with a high fitness value are selected for further verification. At this stage, the face symmetry is measured and the existence of the different facial features is verified for each face candidate.

Alternatively, face-detection is performed by means of convolutional neural networks and/or support vector machines. In deep learning, a convolutional neural network (CNN, or ConvNet) is a class of deep neural networks, most commonly applied to analyze visual imagery. They are also known as shift invariant or space invariant artificial neural networks (SIANN), based on the shared-weight architecture of the convolution kernels or filters that slide along input features and provide translation equivariant responses known as feature maps. Counter-intuitively, most convolutional neural networks are only equivariant, as opposed to invariant, to translation. They have applications in image and video recognition, recommender systems, image classification, image segmentation, medical image analysis, natural language processing, brain-computer interfaces, and financial time series. CNNs are regularized versions of multilayer perceptrons. Multilayer perceptrons usually mean fully connected networks, that is, each neuron in one layer is connected to all neurons in the next layer. The "full connectivity" of these networks make them prone to overfitting data. Typical ways of regularization, or preventing overfitting, include: penalizing parameters during training (such as weight decay) or trimming connectivity (skipped connections, dropout, etc.) CNNs take a different approach towards regularization: they take advantage of the hierarchical pattern in data and assemble patterns of increasing complexity using smaller and simpler patterns embossed in their filters. Therefore, on a scale of connectivity and complexity, CNNs are on the lower extreme.

CNNs are often used in image recognition systems. In 2012 an error rate of 0.23% on the MNIST database was reported. Another paper on using CNN for image classification reported that the learning process was "surprisingly fast"; in the same paper, the best published results as of 2011 were achieved in the MNIST database and the NORB database. Subsequently, a similar CNN called AlexNet won the ImageNet Large Scale Visual Recognition Challenge 2012. When applied to facial recognition, CNNs achieved a large decrease in error rate. Another paper reported a 97.6% recognition rate on "5,600 still images of more than 10 subjects". CNNs were used to assess video quality in an objective way after manual training; the resulting system had a very low root mean square error.

In machine learning, support-vector machines (SVMs, also support-vector networks) are supervised learning models with associated learning algorithms that analyze data for classification and regression analysis. Given a set of training examples, each marked as belonging to one of two categories, an SVM training algorithm builds a model that assigns new examples to one category or the other, making it a non-probabilistic binary linear classifier (although methods such as Platt scaling exist to use SVM in a probabilistic classification setting). SVM maps training examples to points in space so as to maximize the width of the gap between the two categories. New examples are then mapped into that same space and predicted to belong to a category based on which side of the gap they fall. In addition to performing linear classification, SVMs can efficiently perform a non-linear classification using what is called the kernel trick, implicitly mapping their inputs into high-dimensional feature spaces. When data are unlabeled, supervised learning is not possible, and an unsupervised learning approach is required, which attempts to find natural clustering of the data to groups, and then map new data to these formed groups.

After the face detection S102, Alice's smartphone 1 determines S103, that the face 21 is associated with another person, Bob or more precisely another person's device, i.e. Bob's smartphone 4 (illustrated within FIG. 1B). According to an example, this is carried out by: calculating, by Alice's smartphone 1, a first identifier $x_1$ of the face 21 as discussed in the summary section. The first identifier $x_1$ may be calculated using a pre-defined person re-identification, reID, network. In general, a re-identification network is fed image patches to give rise to an identity vector. This network may be based on a machine learning model, which is trained to produce the same identity vector when image patches are taken from the same object, for example from the same person. There are many ways to train the re-identification network to output a specific type of identity vector and to define how such vectors are used to distinguish between identities. For example the re-identification network can be trained to produce a vector of fixed sized independent components. Two identity vectors are then considered to belong to the same object if a certain number of components of the two identity vectors have a distance smaller than a predefined threshold.

After the first identifier has been determined by Alice's smartphone, Alice's smartphone communicates with other smartphones that are located close by or otherwise known to be associated with the captured image, to determine with which other device the first identifier is associated in order to then obtain privacy setting data from said device in order to determine whether or not to anonymize the occurrence of the anonymizable object in the captured image. These steps are further explained below.

Finally, Alice's smartphone 1 modifies S105, by altering the image 3 by replacing S105A the face 21 with a similar, non-privacy-infringing humanoid face 71 to generate a processed image 7, the human face 21 in the image 3 by using privacy setting data received from Bob's smartphone 4 (illustrated within FIG. 18). Alice's smartphone 1 and Bob's smartphone 4 relate to the first and second devices of the summary section respectively.

Figure 2:
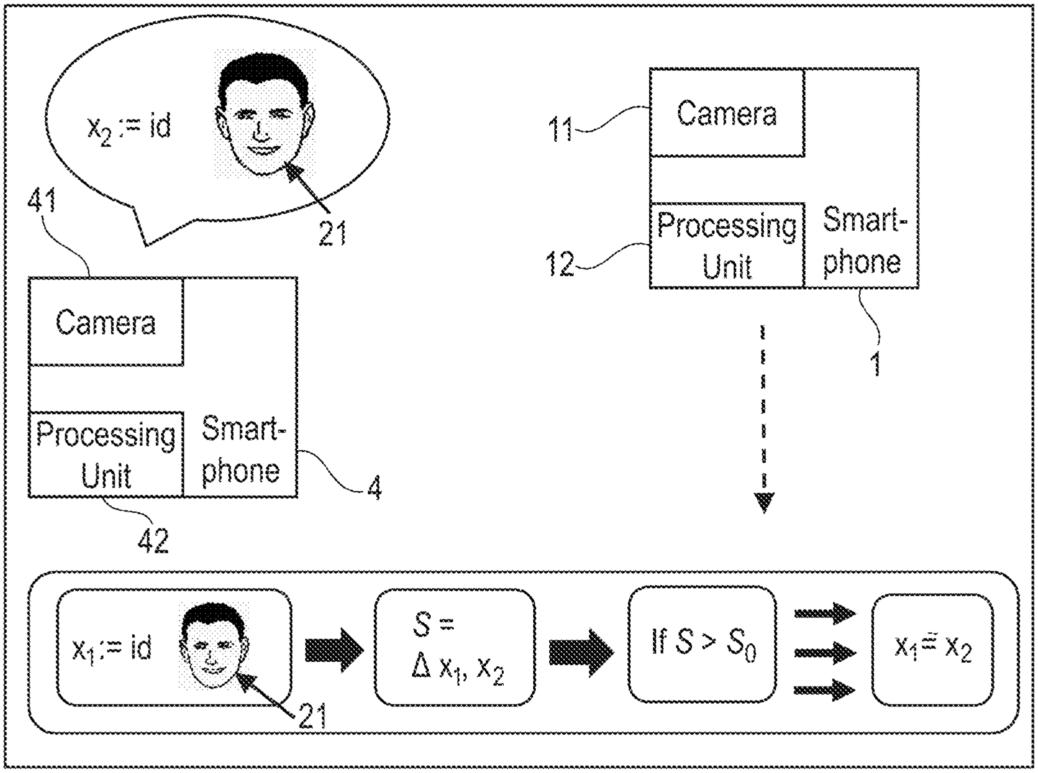
FIG. 2 shows a more detailed schematic illustration of a determining step of the described method.

FIG. 2 shows a schematic illustration of a step involved in a method of selective image modification. Specifically, said step relates to the step wherein Alice's smartphone 1 determines, by calculating a first identifier $x_1$ of the human face 2*a*, that the human face 21 is associated with Bob's smartphone 4 (illustrated within FIG. 18). Then, her smartphone 1 calculates a similarity measure S between the first identifier $x_1$ and a second identifier $x_2$ comprised by Bob's smartphone 4, which has been obtained by Alice's phone as further described below.

For the present example, the first identifier $x_1$ and the second identifier $x_2$ are often numeric due to their specific involvement in terms of calculating the similarity measure S which is a real-valued function, which is commonly used in statistics and related fields, to quantify the similarity between two objects. Although no single definition of a similarity measure exists, usually such measures are in some sense the inverse of distance metrics: they take on large values for similar objects and either zero or a negative value for very dissimilar objects. Cosine similarity is a commonly used similarity measure for real-valued vectors, used in (among other fields) information retrieval to score the similarity of documents in the vector space model. In machine learning, common kernel functions such as the RBF kernel can be viewed as similarity functions.

The first identifier $x_1$ and the second identifier $x_2$ may each be calculated using a pre-defined person re-identification, reID, network as discussed in the summary section. In general, a re-identification network is fed image patches to give rise to an identity vector. This network may be based on a machine learning model, which is trained to produce the same identity vector when image patches are taken from the same object, for example from the same person. There are many ways to train the re-identification network to output a specific type of identity vector and to define how such vectors are used to distinguish between identities. For example the re-identification network can be trained to produce a vector of fixed sized independent components. Two identity vectors are then considered to belong to the same object if a certain number of components of the two identity vectors have a distance smaller than a predefined threshold.

Existing Re-ID methods generally come under two main trends: closed world and open-world settings. Closed-world person re-identification usually has the following assumptions: 1) person appearances are captured by single-modality visible cameras, either by image or video; 2) The persons are represented by bounding boxes, where most of the bounding box area belongs the same identity; 3) The training has enough annotated training data for supervised discriminative Re-ID model learning; 4) The annotations are generally correct; 5) The query person must appear in the gallery set. Typically, a standard closed-world Re-ID system contains three main components: Feature Representation Learning, which focuses on developing the feature construction strategies; Deep Metric Learning, which aims at designing the training objectives with different loss functions or sampling strategies; and Ranking Optimization, which concentrates on optimizing the retrieved ranking list. Open-world person re-identification refers to the scenario where large-scale person identities across cameras may only partially overlap in an unknown spatial environment.

Finally, Alice's smartphone 1 determines that the human face 21 is associated with Bob's smartphone 4 if the similarity measure S is above a predefined similarity threshold $S_0$. The similarity measure S is numeric and may be calculated, for example based on a predefined numerical metric and it may be determined that the human face 21 is associated with Bob's smartphone 4 if the first identifier $x_1$ and the second identifier $x_2$ are considered equivalent with respect to the similarity measure S and/or the predefined metric. For example, equivalence can be decided based on a threshold $S_0$. Depending on the used metric, two identifiers may for example be considered equivalent if and only if the similarity measure S is above a predefined similarity threshold S. As a simplified example, assuming $S_0=0.77$, the two identifiers $x_1$ and $x_2$ may be considered equivalent if S is any numerical value greater than $S_0$ ($S>0.77$). Alternatively, when using an inverse similarity measure (i.e. where the score is lower for more similar objects), the two identifiers can be considered equivalent if and only if the similarity measure is below a predefined similarity threshold. As a simplified example, assuming $S_0=0.77$, the two identifiers $x_1$ and $x_2$ may be considered equivalent if S is any numerical value less than $S_0$($S<0.77$). The metric can, for example, be implemented as a similarity or distance function between $x_1$ and $x_2$.

FIG. 3 shows a schematic illustration of a step involved in a method of selective image modification. Specifically, said step relates to Alice capturing the image 3 of the object 2 using the camera 1*a* of her smartphone 1 (illustrated within the upper left rectangle of FIG. 1). This process involves Alice's smartphone 1 being physically separated from Bob's smartphone 4 by a distance smaller than or equal to a distance threshold $D_0$. For example, Alice's smartphone 1 might be configured so that $D_0$=100 meters; this would imply that Alice's smartphone 1 would be able to perform selective image modification for any phones within a 100 meter-radius of her smartphone's current position, where the distance is determined for example using GPS, LTE or 5G New Radio.

FIG. 4 shows a schematic illustration of a method of selective image modification. In this illustration, Bob uses a camera 41 of his smartphone 4 to capture S1001 an image 6. For example, the image 6 is that of Bob himself or of another person associated with his smartphone 4 such as a family member. Similar to Alice, he ensures that the camera 4 is used only after said mobile application has been activated. Differently to Alice, however, this might be done by first starting up said mobile application, then running the camera 4; the mobile application may run a camera application programming interface (API) in the background of his smartphone 4 as a result. Then, Bob's smartphone 4 detects S1002 his face 51 in the image 6. Afterwards, Bob's smartphone 4 calculates S1003 the second identifier $x_2$ of his face 51 in the image 6; he might be doing this in order to, upon being prompted by a third party, provide said third party with information indicating his identifier and associated privacy setting data in case said third party accidentally captures his face 51 in an image. The second identifier $x_2$ is stored within a memory associated with Bob's smartphone 4. The memory may preferably be an internal storage of the smartphone 4 or may alternatively be a cloud storage associated with the smartphone 4. Alternatively to storing a single identifier $x_2$ associated with the smartphone 4, a plurality of identifiers might be associated with his smartphone 4, such as identifiers relating to family members that usually travel with him.

Optionally, Bob is prompted by the mobile application whether to store the second identifier $x_2$ in the public/private cloud storage associated with the memory of his smartphone 4. Upon consenting to the second identifier $x_2$ being stored in the public/private cloud, the second identifier $x_2$ might be transmitted to the public/private cloud by means of a public network such as the Internet or a private network such as a VPN.

FIG. 5 shows a schematic illustration of a step of the method of selective image modification. In particular, FIG. 5 shows the communication between the Alice's smartphone 1 and Bob's smartphone 4 which is necessary in order to determine if the identifiers match. This communication is complicated to implement as the communication between the two devices should also not cause any additional privacy infringement, in particular as other devices (of people who are not in the image) can also be involved in the communication. In this illustration, Alice's smartphone 1 broadcasts S201 a signal comprising at least a portion of the first identifier $x_1$. For example the signal comprises the first 50% of the first identifier $x_1$. The broadcasting S201 may be performed by means of radio waves generated from her smartphone 1. Then, Bob's smartphone 4 receives S202 the signal. After, Bob's smartphone 4 determines that there is a partial match between the first 50% of the first identifier $x_1$ and the first 50% of the second identifier $x_2$. Finally, Bob's smartphone 4 transmits S203 the second identifier $x_2$ and the privacy setting data to Alice's smartphone 1. This transmission S203 may be done over Bluetooth, Wi-Fi, LTE or 5G New Radio. The privacy setting data 211 may consist of information indicating whether Bob wants to opt in or opt out of the image 3 captured S101 by Alice's smartphone 1 in terms of the human face 21 in the image 3. The privacy setting data 211 may further optionally be configured to indicate opting in or opting out of the image 3 based upon factors such as the environment or surroundings in which the human face 21 is captured and/or the mood displayed by the human face 21.

If the captured image is a video frame, then Alice's smartphone 1 may additionally take one or more subsequent video frames into account when detecting of the anonymizable object and also when determining the first identifier. Furthermore, when the first image is a video frame taken from a video sequence or video stream, the video sequence is modified to anonymize the anonymizable object based on an appearance of the anonymizable object, i.e. the anonymizable object is modified in the same manner throughout the entire video sequence.

To further increase the security of the communication between the first and second device, it is furthermore possible to encrypt the communication so that the first device does not get access to unencrypted second identifiers which are send to the first device for comparison in order to determine if said second identifiers match the first identifier. This is in particular relevant in case the second identifier does not match the first identifier. The encryption can, for example, be based on a homomorphic encryption scheme to ensure that small differences between the first and second identifier do not cause larger differences between the encrypted first and second identifiers, so that a similarity threshold can still be used for the encrypted identifiers. However, such an encryption scheme still has the drawback that an identifier x is always mapped to the same encrypted identifier $f(x)$, so that privacy infringement can still be caused by matching encrypted identifiers collected over time in order to derive information about the user to which said identifier x belongs.

To counter these difficulties, it is possible to implement the encryption is a double blind encryption scheme as already discussed above.

Based on the first identifier $x_1$, an encryption process of the first device is used to generate at least two encryptions for the first identifier $x_1$. In order to generate at least two encryptions S and T of the first identifier $x_1$, an individual private key n is generated which serves as an offset and to further safeguard the encryptions. The generation of the private key is, for example, performed by a private key generating unit. Encryptions S and T are then generated based, at least in part, on the first identifier $x_1$, the private key n and, preferably, a cryptographic function/as well as a common secret k or common secret parts b and d. The generation of the encryptions S and T is, for example, performed by a public key generating.

Similarly, the second device determines a set of second encryptions based on the second identifier $x_2$. To determine the second set of encryptions, the second device calculates an individual private key m for the second identifier $x_2$, which functions as an offset to prevent the comparison of the calculated encryption by simple means.

Based on the second identifier x and the private key m, the second device then calculates at least two second encryptions Q and R, preferably using a cryptographic function/and a common secret k, which are also used by the encryption process of the first device. Instead of a common secret k, also common secret parts a and c may be used as further explained below. The two second encryptions Q and R are thus generated.

The first smartphone 1, after capturing S101 the image 3 comprising the face 21 then broadcasts a message indicating that it just captured an image comprising privacy infringing information. The second encryption set E2, which comprises the second encryptions Q and R is then transmitted to the first device and the first device then compares said first set of encryptions with the second set of encryptions and determines whether there is an equivalence between the first and second set of encryptions.

Below the used encryption scheme is first described at a higher level but, for exemplary reasons, only using two encryptions in each set. It is, however, easily possible to generalize the proposed scheme to any number of encryptions in both sets of encryptions.

The used encryption and comparison scheme is based on comparing two separately captured objects in such a manner, that the first device does not obtain any information regarding the actual second identifier, nor regarding the keys used for encrypting said second identifier.

The predefined comparison operation is based on performing two separate arithmetic operations, each of which is performed by taking arguments from both the encryptions provided by the first device and the encryptions provided by the second device. Thus, a cross-check is implemented, which is designed to cancel out the respective offsets when comparing the results of the two separately performed arithmetic operations, so that a comparison of the results of the two arithmetic operations amounts to a comparison of the two identifiers based on which, on the one hand, the encryptions of the first device, and, on the other hand, the encryptions of the second device were determined. As the encryption is implemented using a cryptographic function, together with a compatible binary operation, the encryptions are computationally very expensive to reverse, but the comparison is still easily computable.

Thus, S, T, Q and R are calculated based on the respective identifiers x and y and the respective private keys n and m, using a common key k and a cryptographic function $f$ with a matching binary operation $\oplus$, i.e. $f(v \oplus w)=f(v) \oplus f(w)$ for all v, w in the domain of the cryptographic function $f$ in the following manner, $$Q = f(2x_2 \oplus m);\ R = f(x_2 \oplus m \oplus k);$$

$$S = f(n \oplus k);\ \text{and}\ T = f(n \oplus x_1).$$

Then, it is possible to decide if $x_1=x_2$ by deciding if $Q \oplus S = R \oplus T$.

In order to further increase the security, it is additionally possible to prevent the attacker from spoofing the system by using common secret parts of k instead of one common secret k known to both devices. This is achieved by generating two random splits of k, i.e. numbers a, b, c and d, wherein $k=a \oplus b$, $k=c \oplus d$, $a=c$ and $a \neq d$. The respective random splits could be assigned to the respective device when the application is first installed. The values for the encryptions S, T, Q and R can now be calculated as follows $$Q = f(2x_2 \oplus m \oplus a);\ R = f(x_2 \oplus m \oplus c);$$

$$S = f(n \oplus b);\ \text{and}\ T = f(n \oplus x_1 \oplus d).$$

Then, it is again possible to decide if $x_1=x_2$ by deciding if $Q \oplus S = R \oplus T$.

Similar to the direct comparison of first and second identifier by way of a similarity measure as described above, it is also possible to allows for a limited difference between $Q \oplus S$ and $R \oplus T$.

Detailed examples regarding some encryption and comparison schemes in order to achieve the object of this disclosure, i.e. to provide a secure method for selective anonymization, are provided below. Detailed examples are provided for cryptographic functions based on elliptic curve cryptography and RSA using two distinct encryptions for each of the encryption sets. It is, however, easily possible to modify the schemes for other cryptographic functions and encryption sets comprising more than two components.

Encryption Based on Elliptic Curves

The encryption scheme discussed above can be implemented using elliptic curves in the following manner:

$$f(x) = l \cdot x \bmod P,$$

where l and P are predefined numbers defining the respective elliptic curve. Thus, $f$ is the point multiplication of elliptic curves with a modulo. Calculating the point multiplication scales logarithmic with l, the reverse operation scales linearly with l. So, for very large l, this is a one-way function computationally.

Furthermore, for elliptic curves, the binary operator $\oplus$, which is preserved by $f$ is defined as $u \oplus v=(u+v) \bmod P$, which is the elliptic curve point addition with a modulo.

In case two encryptions S and T are calculated by the edge device and two encryptions Q and R are calculated by the setup device, and a common secret k is used for both the edge and the setup device, then, for example, $$Q = (l \cdot (2x_2 + m)) \bmod P;\ R = (l \cdot (x_2 + m + k)) \bmod P;$$

$$S = (l \cdot (n + k)) \bmod P;\ \text{and}\ T = (l \cdot (n + x_1) \bmod P.$$

If the common secret k is to be split into common secret parts a, b, c and d, this can be achieved in the case of elliptic curves by selecting a, b, c and d such that k=(a+b)mod P; and k=(c+d)mod P.

$$Q = (l \cdot (2x_2 + m + a)) \bmod P;\ R = (l \cdot (x_2 + m + c)) \bmod P;$$

$$S = (l \cdot (n + b)) \bmod P;\ \text{and}\ T = (l \cdot (n + x_1 + d)) \bmod P.$$

Encryption Based on the RSA Algorithm

The encryption scheme discussed above can be implemented using an RSA-scheme in the following manner:

$$f(x) = x^l \bmod P,$$

where l and P are predefined numbers. Thus, $f$ is the exponentiation with a modulo. As known in the context of RSA, this operation is a one-way function for sufficiently large l. Furthermore, for RSA, the binary operator $\oplus$, which is preserved by $f$ is defined as u⊕v=(u·v)mod P, which is multiplication with a modulo. Then:

$$Q=(2x_2\cdot m)^l \bmod P;\ R=(x_2\cdot m\cdot k)^l \bmod P;$$

$$S=(n\cdot k)^l \bmod P;\ \text{and}\ T=(n\cdot x_1)^l \bmod P.$$

If the common secret k is to be split into common secret parts a, b, c and d, this can be achieved in the case of RSA by selecting a, b, c and d such that k=(a·b)mod P; and k=(c·d)mod P.

$$Q=(2x_2\cdot m\cdot a)^l \bmod P;\ R=(x_2\cdot m\cdot c)^l \bmod P;$$

$$S=(n\cdot b)^l \bmod P;\ \text{and}\ T=(n\cdot x_1\cdot d)^l \bmod P.$$

Other public key encryption schemes could also be used based on the one-way function implemented within said other public key encryption schemes.

FIG. 6 shows a schematic illustration of a method step of a method of selective image modification. This involves modifying S105, by Alice's smartphone 1, the human face 21 of the image 3 based on privacy setting data 211 received from Bob's device 4. This further includes altering, by Alice's smartphone 1, the image 3 by replacing S105A the human face 21 with a similar, non-privacy-infringing object 71 to generate a new image 7. Specifically, said step relates to in particular to a processing unit 12 of Alice's smartphone 1 modifying the human face 21 in the image 3 by using the privacy setting data 211 received from Bob's smartphone 4 (illustrated within FIG. 1B). For example, if the privacy setting data 211 consists of information indicating that Bob wants to have his facial data anonymized, Alice will apply this information and allow her smartphone 1 to modify the image 3 as appropriate. Alternatively, no explicit user interaction between Alice and her smartphone 1 is performed during the image modification. This process comprises Alice's smartphone 1 automatically altering the image 3 by replacing S105A the human face 2*a* with a non-privacy-infringing humanoid face 71 to generate a new image 7.

The non-privacy-infringing humanoid face 71 might have physical dimensions and distinctive features which are proportionate to the human face 21.

A typical human face comprises several distinct areas, of which the main features are: the forehead, comprising the skin beneath the hairline, bordered laterally by the temples and inferiorly by eyebrows and ears, the eyes, sitting in the orbit and protected by eyelids and eyelashes, the distinctive human nose shape, nostrils, and nasal septum, the cheeks, covering the maxilla and mandibula (or jaw), the extremity of which is the chin, and the mouth, with the upper lip divided by the philtrum, sometimes revealing the teeth.

The non-privacy-infringing humanoid face 71 may be determined by taking into account the human face 21 by applying Deep Natural Anonymization, DNA. The non-privacy-infringing humanoid face 71 may mirror the actual mood displayed by the human face 21 as a result of Deep Natural Anonymization, DNA as discussed in the summary section. Deep natural anonymization is a technology designed to change an identity vector of an appearance. How much the identity vector is changed is dependent on which attributes should be retained after anonymization and is, therefore, dependent on the application. The minimum requirement is that ID(x)≠ID(DNA(x)) wherein x is an appearance, ID is the re-identification network, or respective mapping, and DNA is the deep natural anonymization mapping.

Deep natural anonymization has the advantage of removing privacy infringing details while preserving other, non-privacy infringing information, for example, in the case of a face, this may mean that the face is modified beyond recognition (by both a human and a facial detection algorithm) while other information such as facial expression, age, gender, ethnicity is preserved. Data that is modified using deep natural anonymization can be used for analytics, for example, regarding consumer satisfaction, etc. without infringing on the privacy of the depicted individuals. Other applications include autonomous driving, people counting and distance measurement. In general, deep natural anonymization determines a different naturally anonymized version for each occurrence of the same person or another identifiable objects, such as license plates. Depending on the application, in addition to anonymizing facial characteristics, other identifying characteristics such as hair, clothes, gait, etc. may also need to be modified.

Alternatively the image modification might be performed via a computer vision algorithm based on generative adversarial networks (GANs). In other words, the non-privacy-infringing humanoid face 71 based on the human face 21 is generated using a GAN. Then, the pixel values of the area in the image 3 where the human face 21 is located are deleted. Next, the generated non-privacy-infringing humanoid face 71 is placed where the human face was 21 in the image 3. Finally, the colors based on the background and the surrounding of the non-privacy-infringing humanoid face 71 are adjusted. This technique enables the generation of highly realistic faces that are seamless integrated into the original image. Conversely, if the privacy setting data consists of information indicating that Bob wants to opt in of the image 3, Alice will apply this information and allow her smartphone 1 to retain the image 3 as originally captured.

Computer facial animation might be applied for generating said non-privacy-infringing humanoid face 71.

Computer facial animation is primarily an area of computer graphics that encapsulates methods and techniques for generating and animating images or models of a character face. The character can be a human or humanoid etc. Due to its subject and output type, it is also related to many other scientific and artistic fields from psychology to traditional animation. Computer facial animation has become well-known and popular through animated feature films and computer games but its applications include many more areas such as communication, education, scientific simulation, and agent-based systems (for example online customer service representatives). With the recent advancements in computational power in personal and mobile devices, facial animation has transitioned from appearing in pre-rendered content to being created at runtime. The main techniques used to apply facial animation to a character are: morph targets animation, bone driven animation, texture-based animation (2D or 3D), and physiological models. Morph targets (also called "blendshapes") based systems offer a fast playback as well as a high degree of fidelity of expressions.

LIST OF REFERENCES

1 Alice's smartphone
11 image-capturing unit of Alice's smartphone
12 processing unit of Alice's smartphone
2 first object
21 unfamiliar human face

211 privacy setting data of 21
3 image containing 2 and 21
4 Bob's smartphone
41 image-capturing unit of Bob's smartphone
42 processing unit of Bob's smartphone
51 Bob's face
6 image containing Bob's face
71 non-privacy infringing humanoid face
7 image containing 71
S101 capturing 3 by means of 11 of 1
S102 detecting, by 1, 21 in 3
S103 determining, by 1, that 21 is associated with 4
S104 sending 211 to 1 from 4
S1001 capturing 6 by means of 41 of 4
S1002 detecting, by 4, 51 in 6
S1003 calculating, by 4, the second identifier of 51 in 6
S201 broadcasting, by 1, a signal comprising at least a first portion of the first identifier
S202 receiving, by 4, the signal
S203 transmitting, by 4, at least a second portion of the second identifier and 211 to 1
S105 modifying, by 1, 21 in 3 by using 211 received from 4
S105A replacing 21 with 71 to generate 7

The invention claimed is:

1. A method of selective image modification for protecting identities, comprising:
capturing a first image using an image-capturing unit of a first device;
detecting, by the first device, an anonymizable object in the first image; and
determining, by the first device, that the anonymizable object is associated with a second device, by:
calculating a first identifier of the anonymizable object;
calculating a similarity measure between the first identifier and a second identifier comprised by the second device;
determining that the anonymizable object is associated with the second device when the similarity measure is above a predefined similarity threshold; and
modifying the anonymizable object in the first image by using privacy setting data received from the second device;
wherein determining that the anonymizable object is associated with the second device further comprises:
determining, by the second device, an individual private key m for the second identifier x2;
determining, by the second device, a second set of encryptions E2 comprising at least two distinct encryptions of the second identifier x2, wherein the encryptions of the second set of encryptions E2 are determined based at least on the individual private key m and the second identifier x2;
determining, by the first device, a private key n;
determining, by the first device, a first set of encryptions E1 comprising at least two distinct encryptions of the first identifier, wherein the encryptions of the first set of encryptions E1 are determined based at least on the individual private key n and the first identifier x1; and
determining that the anonymizable object is associated with the second device responsive to a correspondence between the first and second set of encryptions.

2. The method according to claim 1, wherein during the capturing of the first image by the image-capturing unit of the first device, the first device is physically separated from the second device by a distance smaller than or equal to a distance threshold.

3. The method according to claim 1 further comprising:
capturing a second image using an image capturing unit of the second device;
detecting, by the second device, a reference object in the second image;
calculating, by the second device, the second identifier of the reference object in the second image; and
storing the second identifier within a memory associated with the second device.

4. The method according to claim 1, further comprising:
broadcasting, by the first device, a signal comprising at least a first portion of the first identifier;
receiving, by the second device, the signal;
determining, by the second device, that there is a partial match between the received first portion of the first identifier and the second identifier; and
transmitting, by the second device, at least a second portion of the second identifier and the privacy setting data to the first device.

5. The method according to claim 1, wherein the modifying the anonymizable object of the first image based on privacy setting data received from the second device comprises replacing the anonymizable object with a similar, non-privacy-infringing object to generate a third image.

6. The method according to claim 5, wherein the similar, non-privacy-infringing object is determined from the anonymizable object by applying Deep Natural Anonymization, (DNA).

7. The method according to claim 1, wherein the first identifier and the second identifier are each determined using a pre-defined person re-identification, reID, network.

8. The method according to claim 1, further comprising:
notifying by the first device, to the second device that the anonymizable object is associated with the second device.

9. The method according to claim 1, wherein the first image comprises a video frame captured from a video stream.

10. A first device for selective image modification comprising:
at least one camera to capture a first image;
a processor; and
memory, with instructions stored thereon which, when executed by the processor, cause the processor to:
detect an anonymizable object in the first image;
determine that the anonymizable object is associated with a second device; and
modify the anonymizable object in the first image by using privacy setting data received from the second device; wherein for determining that the anonymizable object is associated with the second device, the instructions cause the processor to:
calculate a first identifier of the anonymizable object;
calculate a similarity measure between the first identifier and a second identifier comprised by the second device; and
determine that the anonymizable object is associated with the second device when the similarity measure is above a predefined similarity threshold;
wherein the instructions further cause the processor to:
determine a private key n;
determine a first set of encryptions E1 comprising at least two distinct encryptions of the first identifier, wherein the encryptions of the first set of encryptions E1 are determined based at least on the private key n and the first identifier x1; and determine that the anonymizable object is associated with the second device responsive to a correspondence between the first set of encryptions and a second set of encryptions received from the second device.

11. The first device for selective image modification according to claim 10, wherein the first image comprises a video frame captured from a video stream.

12. A system for selective image modification, the system comprising:

a first device comprising:

at least one camera to capture a first image;

a processor; and memory with instructions stored thereon, which when executed by the processor, cause the processor to:

detect an anonymizable object in the first image;

determine that the anonymizable object is associated with a second device; and modify the anonymizable object in the first image by using privacy setting data received from the second device, wherein for determining that the anonymizable object is associated with the second device, the instructions cause the processor to:

calculate a first identifier of the anonymizable object;

calculate a similarity measure between the first identifier and a second identifier x2 comprised by the second device; and determine that the anonymizable object is associated with the second device when the similarity measure is above a predefined similarity threshold;

wherein the second device comprises a second processor, and wherein the instructions cause the second processor to: unit that is configured to:

determine an individual private key m for the second identifier x2; and determine a second set of encryptions E2 comprising at least two distinct encryptions of the second identifier x2, wherein the encryptions of the second set of encryptions E2 are determined based at least on the individual private key m and the second identifier x2;

wherein the instructions further cause the first processor to:

determine a private key n;

determine a first set of encryptions E1 comprising at least two distinct encryptions of the first identifier, wherein the encryptions of the first set of encryptions E1 are determined based at least on the private key n and the first identifier x1; and determine that the anonymizable object is associated with the second device responsive to a correspondence between the first set of encryptions and the second set of encryptions received from the second device.

* * * * *